(12) United States Patent
Cimatti

(10) Patent No.: US 9,109,660 B2
(45) Date of Patent: Aug. 18, 2015

(54) AUTOMATIC MANUAL TRANSMISSION FOR A CAR PROVIDED WITH AN INTERNAL COMBUSTION ENGINE

(71) Applicant: Ferrari S.p.A., Modena (IT)

(72) Inventor: Franco Cimatti, Pavullo (IT)

(73) Assignee: Ferrari S.p.A. (IT)

( * ) Notice: Subject to any disclaimer, the term of this patent is extended or adjusted under 35 U.S.C. 154(b) by 247 days.

(21) Appl. No.: 13/911,628

(22) Filed: Jun. 6, 2013

(65) Prior Publication Data

US 2013/0327170 A1   Dec. 12, 2013

(30) Foreign Application Priority Data

Jun. 7, 2012   (IT) ................ B02012A0316

(51) Int. Cl.

| F16H 3/02 | (2006.01) |
|---|---|
| F16H 61/70 | (2006.01) |
| F16H 63/46 | (2006.01) |
| F16H 37/04 | (2006.01) |

(52) U.S. Cl.
CPC ............... *F16H 3/02* (2013.01); *F16H 37/043* (2013.01); *F16H 61/70* (2013.01); *F16H 63/46* (2013.01); *F16H 2037/045* (2013.01); *Y10T 74/19251* (2015.01)

(58) Field of Classification Search
CPC . F16H 2037/045; F16H 37/043; F16H 61/70; F16H 63/46; F16H 3/02; Y10T 74/19251
USPC ..................... 74/325, 329, 331, 334, 335, 340
See application file for complete search history.

(56) References Cited

U.S. PATENT DOCUMENTS

| 3,596,535 | A | * | 8/1971 | Polak ............................. 475/24 |
| 4,403,526 | A |   | 9/1983 | Numazawa et al. |
| 5,819,601 | A |   | 10/1998 | Kuhn |
| 7,607,505 | B2 | * | 10/2009 | Yang ............................. 180/242 |
| 2007/0221427 | A1 | * | 9/2007 | Cimatti et al. ................ 180/247 |
| 2011/0017015 | A1 | * | 1/2011 | Cimatti et al. ............. 74/665 R |
| 2011/0087410 | A1 | * | 4/2011 | Cimatti et al. ................. 701/60 |

(Continued)

FOREIGN PATENT DOCUMENTS

| DE |    4411114 A1 | 10/1995 |
| DE | 102010050126 A1 |  5/2011 |

(Continued)

OTHER PUBLICATIONS

"Italian Application Serial No. IT BO20120316, Search Report dated Jan. 31, 2013", 8 pgs.

*Primary Examiner* — William Kelleher
*Assistant Examiner* — Valentin Craciun
(74) *Attorney, Agent, or Firm* — Schwegman Lundberg & Woessner, P.A.

(57) ABSTRACT

An automatic manual transmission for a car provided with an internal combustion engine, the automatic manual transmission having: a mechanical gearbox provided with at least one primary shaft, at least one secondary shaft, a plurality of pairs of gears and a plurality of locking devices, actuated by first actuators, a variable ratio transmission device, which is arranged upstream of the primary shaft and is adjustable to have two different transmission ratios: a first unitary direct drive transmission ratio and a second multiplying transmission ratio, and a second actuator, which is coupled to the transmission device to vary the transmission ratio of the transmission device itself.

12 Claims, 7 Drawing Sheets

(56) References Cited

U.S. PATENT DOCUMENTS

2013/0327170 A1* 12/2013 Cimatti ........................... 74/335
2014/0011631 A1* 1/2014 Cimatti ............................. 477/5

FOREIGN PATENT DOCUMENTS

| EP | 0024454 A1 | 3/1981 |
|----|------------|--------|
| FR | 2531515 A1 | 2/1984 |

* cited by examiner

AUTOMATIC MANUAL TRANSMISSION FOR A CAR PROVIDED WITH AN INTERNAL COMBUSTION ENGINE

PRIORITY CLAIM AND RELATED APPLICATIONS

This application claims the benefit of priority under 35 U.S.C. Section 119 to Italian Patent Application Serial No. BO2012A000316, filed on Jun. 7, 2012, which Application is incorporated herein by reference in its entirety.

TECHNICAL FIELD

The present invention relates to an automatic manual transmission for a car provided with an internal combustion engine.

BACKGROUND

An automatic manual transmission comprises at least one servo-assisted clutch and a gearbox, which is coupled to the clutch and comprises, in turn, at least one primary shaft, which is adapted to receive torque from a drive shaft of the internal combustion engine, at least one secondary shaft adapted to transmit torque to the drive wheels, a plurality of pairs of gears, each of which defines a corresponding speed and comprises a primary gear mounted on the primary shaft, and a second gear mounted on the secondary shaft and permanently meshing with the primary gear, and a plurality of servo-assisted locking devices (the most common of which are synchronizers), each of which is mounted on a shaft and is adapted to be actuated to lock at least one corresponding gear to the shaft itself. Normally, each locking device is arranged between two gears to engage both the gears in an alternate manner.

The number of pairs of gears increases along with the number of gears, and consequently so does the number of locking devices in the measure of one further locking device for every two additional gears (in the most favorable case in which the total number of gears is an even number). It is thus apparent that increasing the number of gears causes an increase of size, weight and cost of the gearbox.

Patent application DE102010050126A1 describes a vehicle transmission comprising:

a mechanical gearbox, provided with a primary shaft, which is adapted to receive torque from an internal combustion engine, a secondary shaft adapted to transmit the torque to front drive wheels via a differential, and a plurality of pairs of gears, each of which defines a corresponding transmission ratio;

a servo-assisted variable transmission ratio transmission device which is arranged between the secondary shaft of the mechanical gearbox and the differential and is adjustable to have two different transmission ratios L and H; and a control unit which drives the servo-assisted transmission device and establishes which transmission ratio to select as a function of the vehicle speed and/or the drive wheel load.

However, the transmission described in patent application DE102010050126A1 has a relatively high weight and large dimensions; consequently, such a transmission is complex to arrange in a high performance road car.

Overview

The present subject matter relates to an automatic manual transmission for a car provided with an internal combustion engine, which automatic manual transmission is free from the drawbacks described above, is easy and cost-effective to make and, in particular, allows to obtain a high number of gears with small size, light weight and low cost.

According to the present subject matter, an automatic manual transmission for a car provided with an internal combustion engine is provided as disclosed in the accompanying claims.

BRIEF DESCRIPTION OF THE DRAWINGS

The present invention will now be described with reference to the accompanying drawings, which illustrate some non-limitative embodiments thereof, in which.

DETAILED DESCRIPTION

Figure 1:
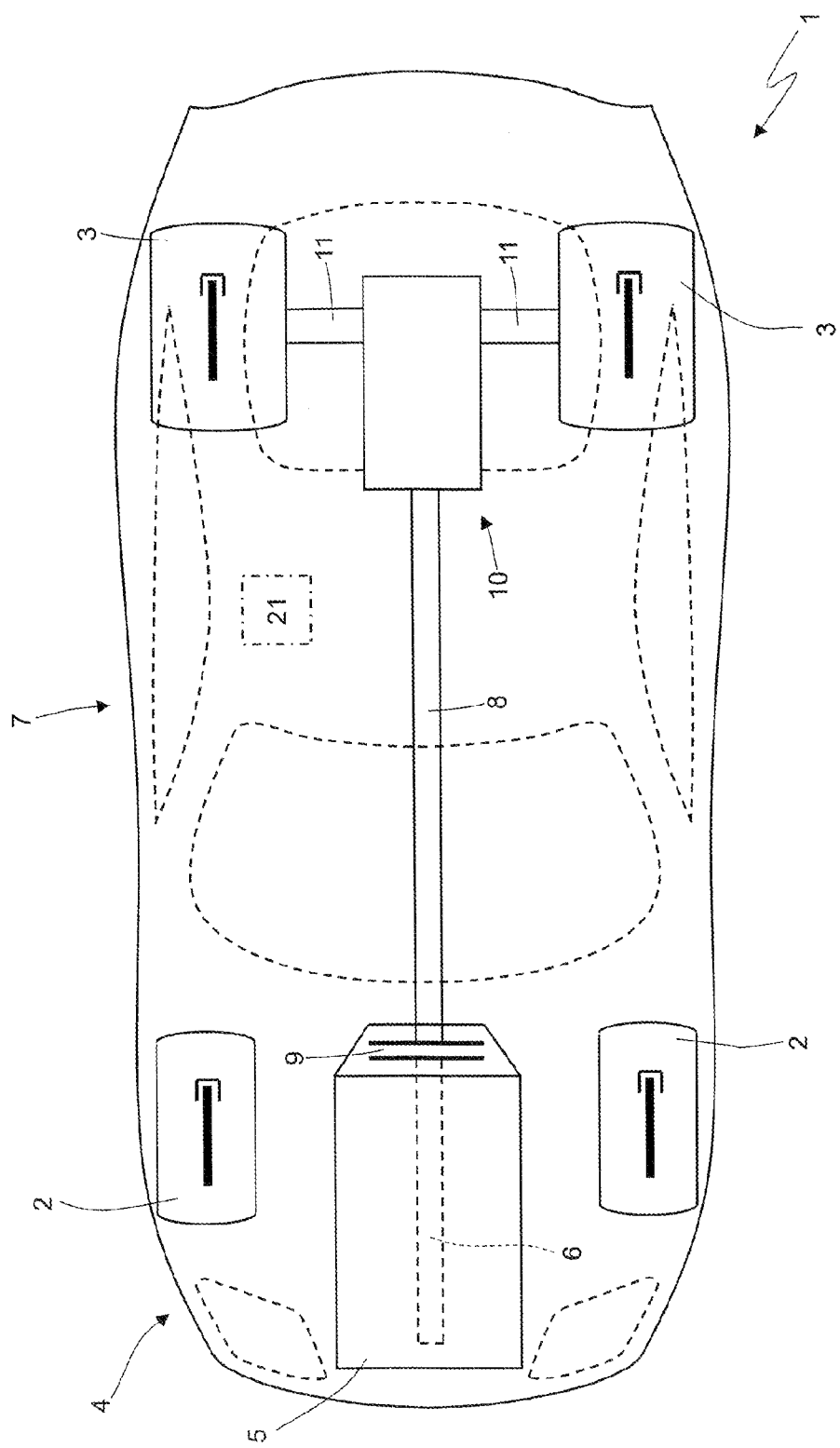
FIG. 1 is a diagrammatic, plan view of a car provided with an automatic manual transmission which is not part of the present subject matter.

In FIG. 1, numeral 1 indicates as a whole a road car provided with two front wheels 2 and two rear drive wheels 3 which receive torque from a powertrain system 4.

The powertrain system 4 comprises an internal combustion thermal engine 5, which is arranged in front longitudinal position and is provided with a drive shaft 6, and an automatic manual transmission 7 (commonly named "AMT"), which transfers the torque generated by the internal combustion engine 5 to the rear drive wheels 3, having a configuration known as a "transaxle". The transmission 7 comprises a propeller shaft 8, one end of which is connected to the drive shaft 6 by means of a servo-assisted clutch 9 (housed in a bell fixed to the engine crankcase) and the other end of which is mechanically connected to a gearbox 10, which is arranged in longitudinal rear position, and transmits motion to the rear drive wheels 3 by means of two drive axles 11.

Figure 2:
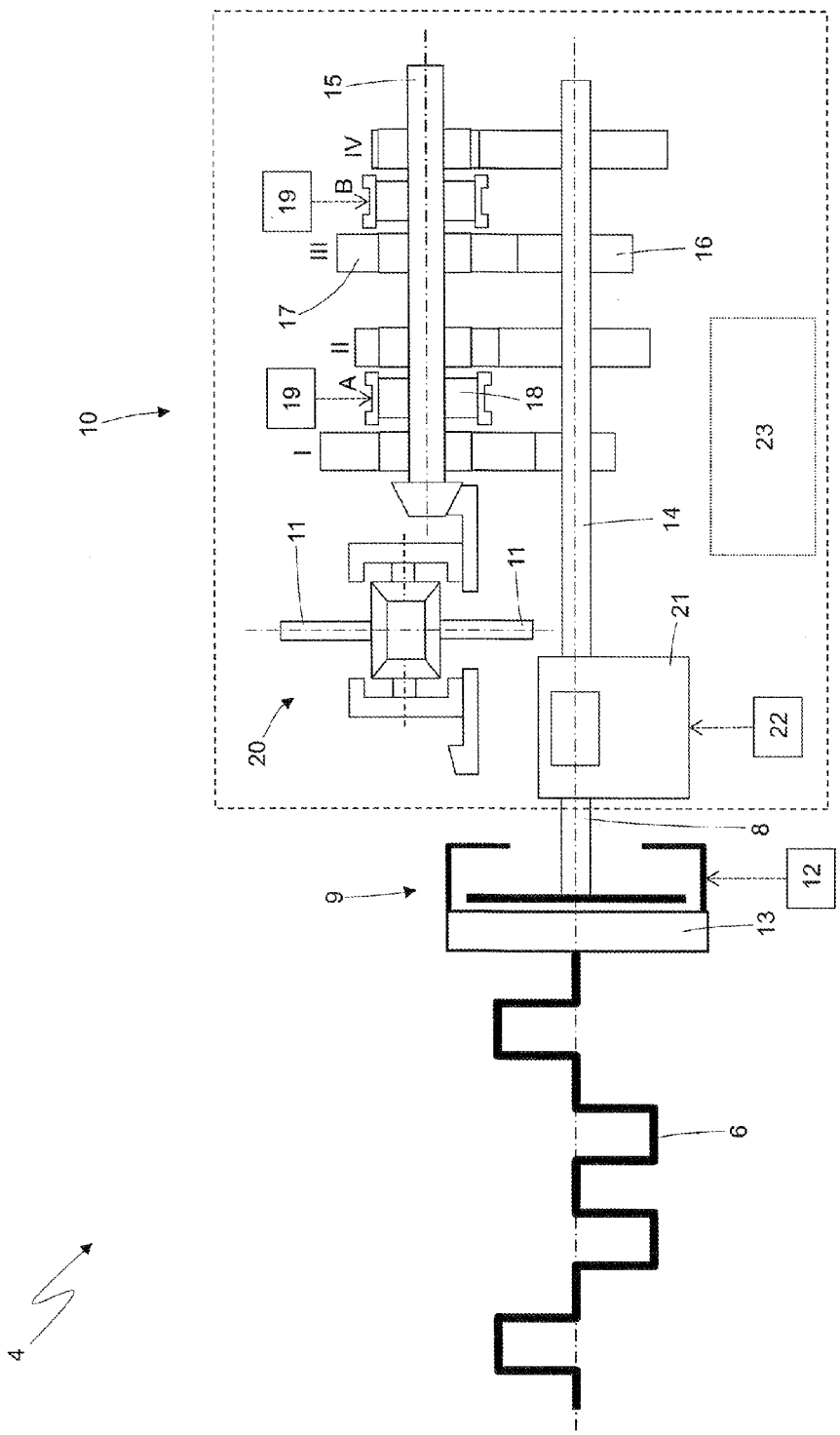
FIG. 2 is a diagrammatic view of the automatic manual transmission in FIG. 1.
Figure 3:
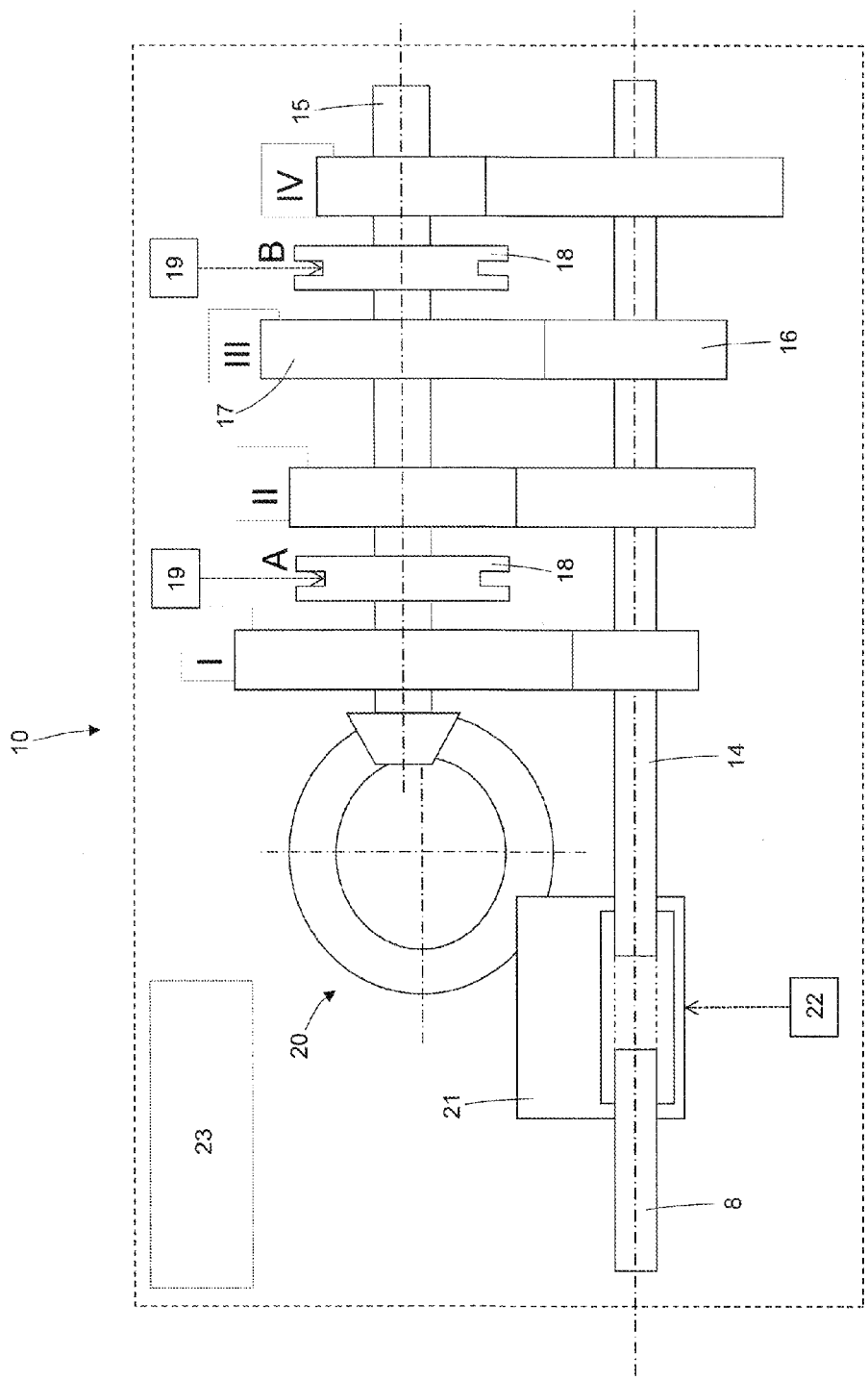
FIG. 3 is a diagrammatic, enlarged scale view of a detail of the automatic manual transmission in FIG. 2.

As shown in FIG. 2, the clutch 9 is servo-assisted, i.e. mechanically coupled to an actuator 12 (hydraulic or electric) which works on the clutch 9 to move the clutch 9 between an open position (in which the clutch 9 separates the drive shaft 6 from the propeller shaft 8) and a closed position (in which the clutch 9 connects the drive shaft 6 to the propeller shaft 8). In other words, the servo-assisted clutch 9 can only interrupt the mechanical connection between the drive shaft 6 and the internal combustion engine 5 and the rear drive wheels 3.

The drive shaft 6 of the internal combustion engine 5 is provided with a flywheel 13 fixed to the end of the drive shaft 6 facing the clutch 9; thus, the clutch 9 receives motion from the flywheel 13 which is essentially an integral part of the drive shaft 6 of the internal combustion engine 5. According to an embodiment, a decoupling device which mechanically filters vibrations, i.e. which blocks (prevents) the transmission of vibrations, is arranged between the drive shaft 6 and the gearbox 10. The decoupling device can be integrated in the flywheel 13 which consists of a double damped flywheel (e.g. with an integrated centrifuge damper); in other words, in the flywheel 13, the weight is split between two discs connected to each other by means of springs which damp the relative rotation between the two discs itself. The internal combustion engine 5 produces a series of vibrations on the drive shaft 6, in particular of the torsion type; in absence of filters, these vibrations are transmitted to the gearbox 10 and cause major vibrations on the gears, with consequently jangling. For this reason, it is useful to insert a torsion shock absorber, i.e. a device capable of damping these vibrations and supplying a constant, clean torque to the gearbox 10, between the internal combustion engine and the gearbox 10.

The gearbox 10 comprises a primary shaft 14, a secondary shaft 15 arranged parallel to and by the side of the primary shaft 14, and a plurality of pairs (indicated by Roman numerals I, II, III, IV) of gears 16 and 17, each of which has a corresponding transmission ratio and comprises a primary gear 16 rigidly mounted on the primary shaft 14 and a secondary gear 17, which is idly mounted on the secondary shaft 15 and permanently meshes with the primary gear 16. Furthermore, the gearbox 10 comprises a pair of locking devices 18, each of which is fitted on the secondary shaft 15 and is adapted to be actuated to lock in an alternate manner two corresponding secondary gears 17 to the secondary shaft 15. According to an alternative (and perfectly equivalent) embodiment not shown, the primary gears 16 are idly mounted on the primary shaft 14, the secondary gears 17 are rigidly mounted on the secondary shaft 15, and the two servo-assisted locking devices 18 are fitted coaxial to the primary shaft 14 to engage in an alternate manner the corresponding primary gears 16 to the primary shaft 14.

Each locking device 18 is servo-assisted, i.e. mechanically coupled to an actuator 19 (hydraulic or electric) which works on the locking device 18 to shift the locking device 18 between an intermediate idle position, in which the locking device 18 does not lock any primary gear 16 of the primary shaft 14, and two locking positions, in each of which locking device 18 locks a corresponding secondary gear 17 to the primary shaft 14.

One end of the secondary shaft 15 is mechanically connected to a differential 20, from which the two drive axles 11, which transmit torque to the rear drive wheels 3, originate.

Finally, the gearbox 10 comprises a variable transmission ratio device 21, which is adjustable to have two different transmission ratios, and is interposed between the propeller shaft 8 and the primary shaft 14; in other words, an input of the transmission device 21 is integral with the propeller shaft 8 (i.e. is rigidly restrained to the end of the propeller shaft 8 opposite to the integral end of the clutch 9), and an output of the transmission device 21 is integral with the primary shaft 14 (i.e. is rigidly restrained to an end of the primary shaft 14). The transmission device 21 is adjustable to have a unitary transmission ratio (i.e. a 1:1 transmission ratio by means of which the primary shaft 14 has the same angular speed as the propeller shaft 8) achieved by means of a direct meshing between the propeller shaft 8 and the primary shaft 14; furthermore, the transmission device 21 is adjustable to have a multiplying transmission ratio (i.e. a transmission ratio higher than 1:1 by means of which the primary shaft 14 turns faster than the propeller shaft 8).

The transmission device 21 is servo-assisted, i.e. is mechanically coupled to an actuator 22 (hydraulic or electric) which works on the transmission device 21 to select in an alternate manner the unitary transmission ratio (with which the primary shaft 14 has the same angular speed as the propeller shaft 8) or the multiplying transmission ratio (with which the primary shaft 14 turns faster than the transmission shaft 8).

Finally, the automatic manual transmission 7 comprises an electronic control unit (ECU) which governs the operation of the automatic manual transmission 7 and, among other matters, shifts gears by driving the actuators 12, 19 and 22 in coordinated manner which is fully transparent for the driver (i.e. the driver only sends a shift gear request without having any direct control on which actuators 12, 19 and 22 are actually used to shift the gear).

The second multiplying transmission ratio of the transmission device 21 (the first transmission ratio is also a direct drive ratio) and the transmission ratios of the pairs I, II, III, IV of gears 16 and 17 of the gearbox 10 have values so that all the gears which can be obtained by combining any transmission ratio of the transmission device 21 with any transmission ratio of the gearbox 10 have different transmission ratios without overlaps (i.e. without generating identical or very similar transmission ratios).

Figure 4:
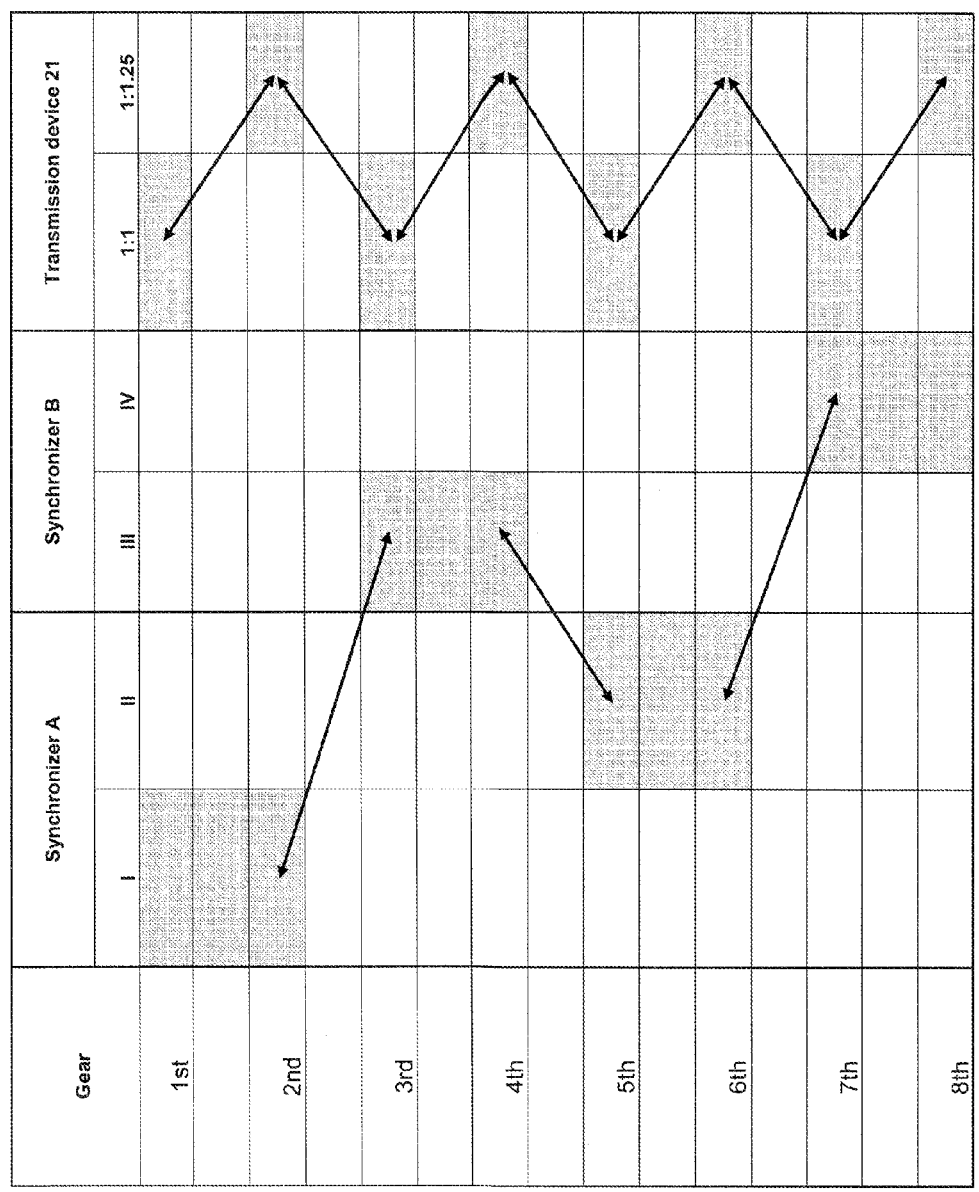
FIGS. 4-6 are three tables which show corresponding embodiments of three selection devices of the automatic manual transmission in FIG. 2 to obtain eight forward gears in total.

According to the embodiment diagrammatically shown in FIG. 4, in order to shift up all gears in sequence from the shortest gear (i.e. the first gear—$1^{st}$ gear) to the longest gear (i.e. eighth gear—$8^{th}$ gear), the control unit 23 actuates the actuator 22 at each gear shift to vary the transmission ratio of the transmission device 21 and actuates in an alternate manner, i.e. for one gear shift but not the next, the actuators 19 of the locking devices 18 to vary the pair I, II, III, IV of engaged gears 16 and 17. Obviously, the control unit 23 controls the actuator 12 to open the clutch 9 before driving the actuator 22 to vary the transmission ratio of the transmission device 21 and the actuators 19 of the locking devices 18 to vary the pair I, II, III, IV of engaged gears 16 and 17; at the same time, the control unit 23 drives the actuator 12 to close the clutch 9 after having driven the actuator 22 to vary the transmission ratio of the transmission device 21 and the actuators 19 of the locking devices 18 to vary the pair I, II, III, IV of engaged gears 16 and 17.

Thus, in order to shift from the first gear ($1^{st}$ gear) having the totally shorter transmission ratio to a second gear ($2^{nd}$ gear) immediately following the first gear ($1^{st}$ gear), the control unit 23 only actuates the actuator 22 (i.e. it does not touch the actuators 19) to vary the transmission ratio of the transmission device 21 from the unitary direct drive transmission ratio to the multiplying transmission ratio (i.e. the control unit 23 does not operate in any manner the actuators 19 of the locking devices 18, which therefore remain stationary in their starting position). In order to shift from the second gear ($2^{nd}$ gear) to an immediately following third gear ($3^{rd}$ gear) the control unit 23 operates the actuators 19 of the locking devices 18 at the same time to vary the pair I, II, III, IV of engaged gears 16 and 17 of the gearbox 10 (i.e. to disengage pair I and engage pair III) and the actuator 22 to vary the transmission ratio of the transmission device 21 from the multiplying transmission ratio to the unitary direct drive transmission ratio.

Figure 5:
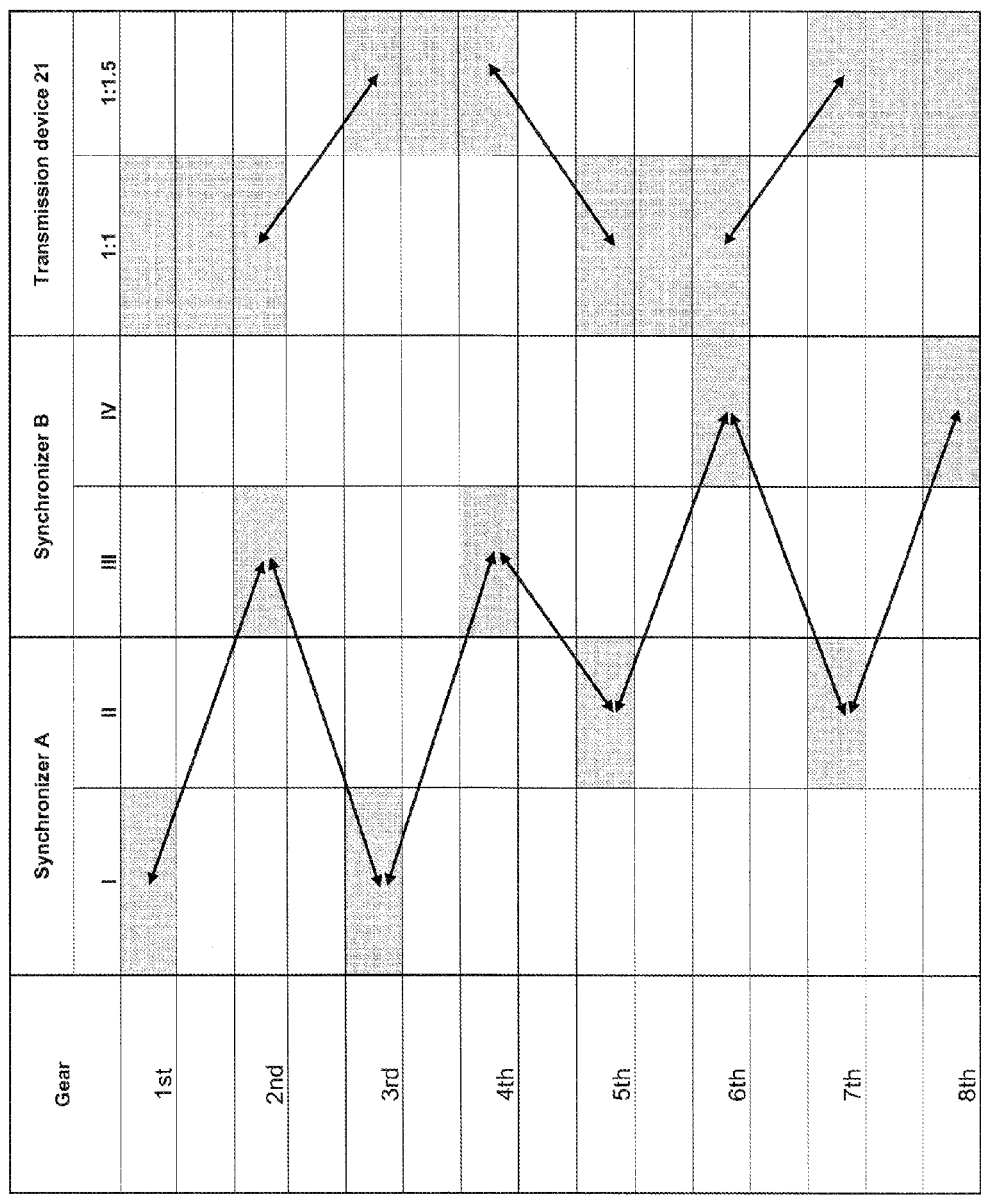

According to the embodiment diagrammatically shown in FIG. 5, in order to shift up all gears in sequence from the shortest gear (i.e. the first gear—$1^{st}$ gear) to the longest gear (i.e. eighth gear—$8^{th}$ gear), the control unit 23 operates the actuators 19 of the locking devices 18 to vary the pair I, II, III, IV of engaged gears 16 and 17 and operates in an alternate manner, i.e. for one gear shift but not the next, the actuator 22 to vary the transmission ratio of the transmission device 21. Obviously, the control unit 23 controls the actuator 12 to open the clutch 9 before driving the actuator 22 to vary the transmission ratio of the transmission device 21 and the actuators 19 of the locking devices 18 to vary the pair I, II, III, IV of engaged gears 16 and 17; at the same time, the control unit 23 drives the actuator 12 to close the clutch 9 after having driven the actuator 22 to vary the transmission ratio of the transmission device 21 and the actuators 19 of the locking devices 18 to vary the pair I, II, III, IV of engaged gears 16 and 17.

Thus, in order to shift from the first gear (1$^{st}$ gear) having the totally shorter transmission ratio to the second gear (2$^{nd}$ gear) immediately following the first gear (1$^{st}$ gear), the control unit 23 only operates the actuators 19 of the locking devices 18 (i.e. does not touch the actuator 22) as the pair I, II, III, IV of engaged gears 16 and 17 of the gearbox 10 change. In order to shift from the second gear (2$^{nd}$ gear) to an immediately following third gear (3$^{rd}$ gear), the control unit 23 operates at the same time the actuators 19 of the locking devices 18 to vary the pair I, II, III, IV of engaged gears 16 and 17 of the gearbox 10 (i.e. to disengage pair I and engage pair III) and the actuator 22 to vary the transmission ratio of the transmission device 21 from the multiplying transmission ratio to the unitary direct drive transmission ratio.

Figure 6:
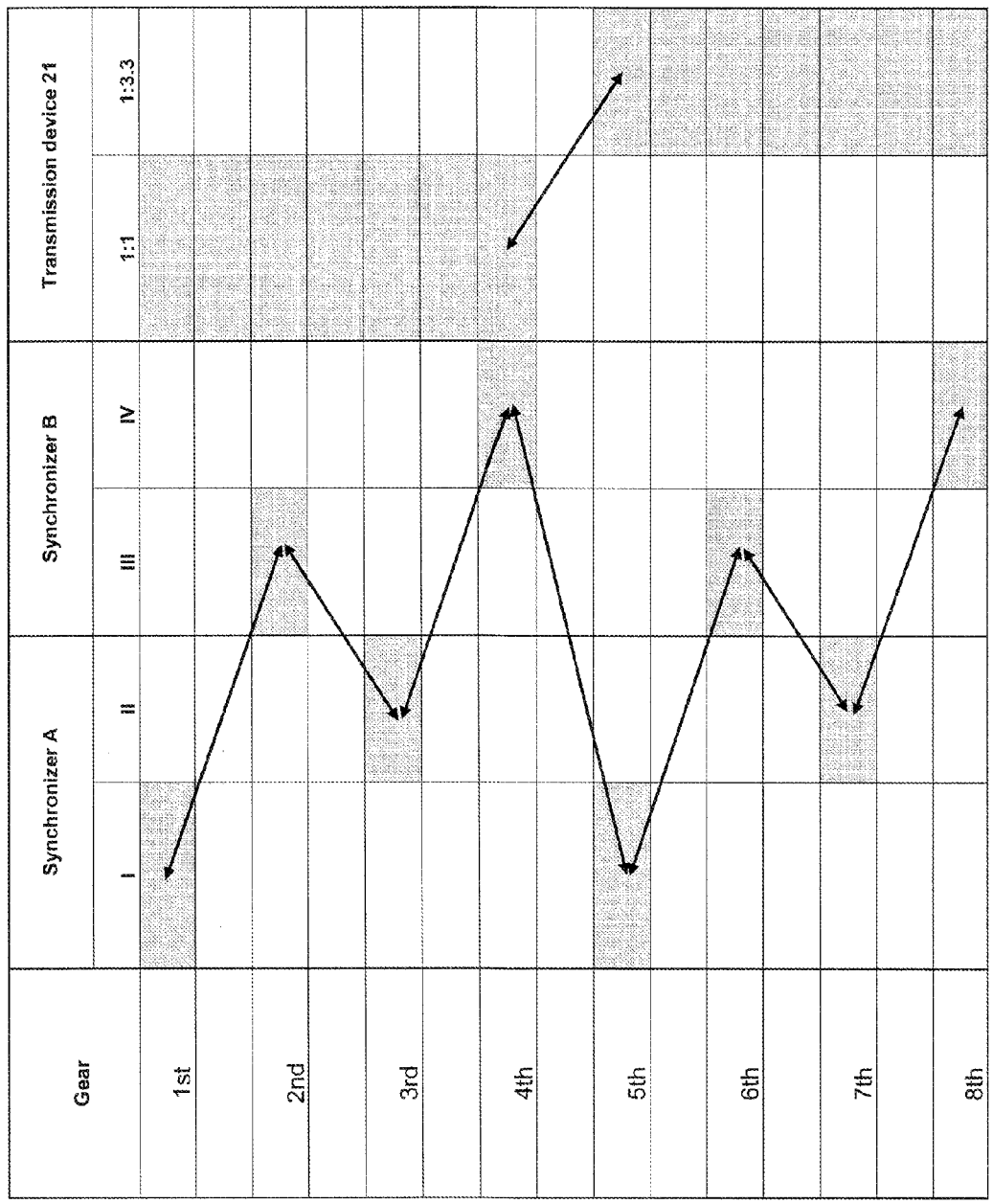

According to the embodiment diagrammatically shown in FIG. 6, all gears are divided into a lower group (comprising the four gears included between first gear—1$^{st}$ gear—and fourth gear—4$^{th}$ gear) and an upper group (comprising the four gears comprised between fifth gear—5$^{th}$ gear—and eighth gear—8$^{th}$ gear) so that the longest gear of the lower group (i.e. the fourth gear—4$^{th}$ gear) has a lower transmission ratio than the shortest gear of the upper gear (i.e. of the fifth gear—5$^{th}$ gear). In order to shift gear in a same group (i.e. between two gears belonging to a same group), the control unit 23 actuates only the actuators 19 of the locking devices 18 (i.e. does not touch the actuator 22) to vary the pair I, II, III, IV of engaged gears 16 and 17 of the gearbox 10. Instead, in order to shift from a gear of the lower group to a gear of the upper group, the control unit 23 simultaneously activates the actuators 19 of the locking devices 18 to vary the pair I, II, III, IV of engaged gears 16 and 17 of the gearbox 10 and the actuator 22 to vary the transmission ratio of the transmission device 21. Obviously, the control unit 23 controls the actuator 12 to open the clutch 9 before driving the actuator 22 to vary the transmission ratio of the transmission device 21 and the actuators 19 of the locking device 18 to vary the pair I, II, III, IV of engaged gears 16 and 17; at the same time, the control unit 23 drives the actuator 12 to close the clutch 9 after having driven the actuator 22 to vary the transmission ratio of the transmission device 21 and the actuators 19 of the locking devices 18 to vary the pair I, II, III, IV of engaged gears 16 and 17.

In the embodiment shown in FIG. 2, the clutch 9 is arranged upstream of the primary shaft 14 of the gearbox 10 and upstream of the transmission device 21 and is mechanically connected to the propeller shaft 8; in particular, the clutch 9 is interposed between the flywheel 13 of the drive shaft 6 and the propeller shaft 8.

Figure 7:
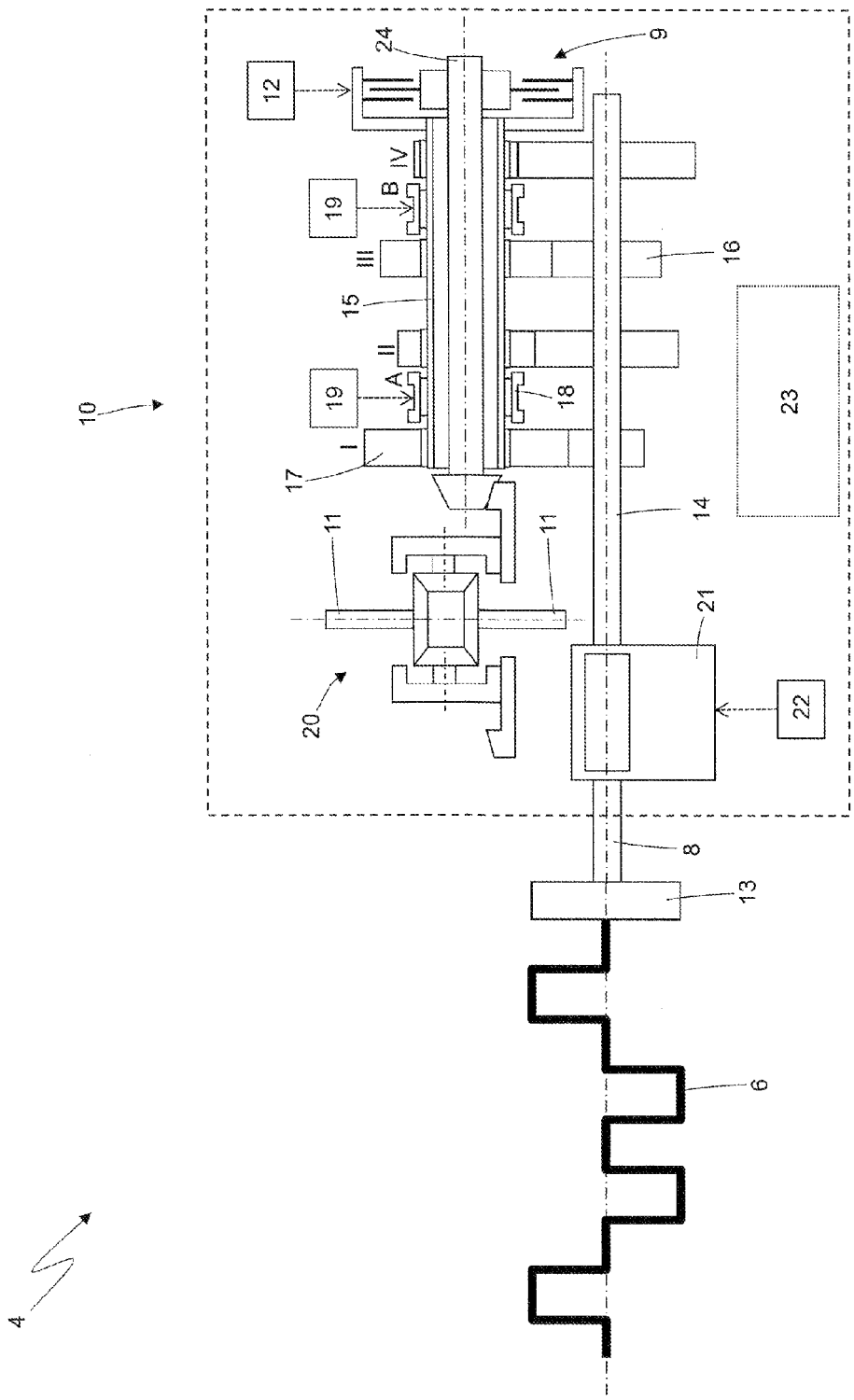
FIG. 7 is a diagrammatic view of a variant of the automatic manual transmission in FIG. 2, made in accordance with the present subject matter.

In the embodiment shown in FIG. 7 according to the present subject matter, the clutch 9 is arranged downstream of the secondary shaft 15 of the gearbox 10 and is interposed between the secondary shaft 15 of the gearbox 10 and the differential 20. In particular, the secondary shaft 15 of the gearbox 10 is tubular and internally hollow to house inside an auxiliary shaft 24, which is connected to the secondary shaft 15 by means of the clutch 9; i.e. a first end of the auxiliary shaft 24 is connected to the clutch 9, and a second end of the auxiliary shaft 24 (arranged opposite to the first end) is connected to the differential 20.

In the embodiment shown in FIG. 2, which is not part of the present subject matter, the clutch 9 is arranged in a conventional position; however, in this position, the clutch 9 generates a geometric constraint at the internal combustion engine 5 due to the external radius of the clutch 9 (which is generally much wider than the external radius of the flywheel 13). Instead, in the embodiment shown in FIG. 7, which is according to the present subject matter, the clutch 9 is arranged in non-conventional position (i.e. between the secondary shaft 15 of the gearbox 10 and the final drive ratio which is the input of the differential 20) in which there is no type of geometric constraint thus allowing to reduce the dimensions at the flywheel 13 (it is worth noting that the flywheel 13, in the embodiment shown in FIG. 7, is much smaller than the flywheel 13 in the embodiment shown in FIG. 2). By removing the clutch 9 from the conventional position at the flywheel 13, it is possible, as previously mentioned, to reduce the diameter of the flywheel 13; in this manner, it is possible to lower the engine internal combustion engine 5 (the flywheel 13 is the lowest point of the internal combustion engine 5), thus lowering the centre of gravity of the road vehicle 1.

In a further embodiment (not shown) which is part of the present subject matter, the clutch 9 is arranged in rear position and is interposed between the propeller shaft 8 and the transmission device 21 (or also between the transmission device 21 and the primary shaft 11). Also in this embodiment, it is possible to reduce the diameter of the flywheel 13, and thus to lower the entire internal combustion engine 5.

The automatic manual transmission 7 described above has many advantages because it allows a high number of gears in presence of small size, light weight and low cost.

This result is obtained as a result of the presence of the variable ratio transmission device 21 which by superimposing on the series of transmission ratios of the gearbox 10, works as a multiplier and allows to multiple the number of gears containing, at the same time, the number of pairs of gears 16 and 17 and of locking devices 18 of the gearbox 10.

For example, in the embodiment shown in the accompanying figures, the two-ratio transmission device 21 allows to obtain, as a whole, an eight-speed automatic manual transmission 7 by using only four pairs of gears 16 and 17 and two locking devices 18 of the gearbox 10; in the (very realistic) case in which the transmission device 21 comprises two pairs of gears and a locking device, the eight-speed automatic manual transmission 7 will have five pairs of gears and three locking devices. A similar conventional eight-speed automatic manual transmission would consist of eight pairs of gears and four locking devices; it is thus apparent that in the automatic manual transmission 7 described above there are two pairs of gears less (from eight to six) and one locking device less (from four to three).

The invention claimed is:

1. An automatic manual transmission for a car provided with an internal combustion engine, the automatic manual transmission comprises:
   a mechanical gearbox comprising:
   at least one primary shaft adapted to receive a torque from a drive shaft of the internal combustion engine;
   at least one secondary shaft adapted to transmit torque to drive wheels;
   a plurality of pairs of gears, each of which has a corresponding transmission ratio and comprises a primary gear mounted on the primary shaft and a secondary gear mounted on the secondary shaft which permanently meshes with the primary gear; and
   a plurality of locking devices, each of which is mounted on at least one of the primary shaft and the secondary shaft and is adapted to be actuated to lock at least one corresponding gear to the respective primary or secondary shaft itself;

a plurality of first actuators, each of which is coupled to a corresponding locking device to actuate the locking device;

a variable ratio transmission device arranged upstream of the primary shaft and adjustable to have two different transmission ratios: a first unitary direct drive transmission ratio and a second multiplying transmission ratio;

a second actuator coupled to the transmission device to vary the transmission ratio of the transmission device itself;

a clutch, which can be opened to interrupt the mechanical connection between the shaft of the internal combustion engine and the drive wheels and is separate and independent from the transmission device;

a third actuator which is coupled to the clutch to open and close the clutch itself and is driven by the control unit; and a control unit to control, in coordinated manner, the first actuators of the locking devices, the second actuator of the transmission device and a third actuator of the clutch to shift gears by combining a transmission ratio of the transmission device with a transmission ratio to obtain a corresponding gear of the automatic manual transmission;

wherein the clutch is arranged downstream of the secondary shaft of the gearbox.

2. An automatic manual transmission according to claim 1, wherein the values of the second multiplying transmission ratio of the drive device and of the transmission ratios of the pairs of gears of the gearbox are such that all the gears which can be obtained by combining any transmission ratio of the drive device with any transmission ratio of the gearbox have different transmission ratios without overlaps.

3. An automatic manual transmission according to claim 1, wherein, in order to shift up in sequence from the shortest gear to the longest gear, the control unit activates, at each gear shift, the second actuator to vary the transmission ratio of the transmission device, and activates in an alternate manner, for one gear shift but not for the next, at least one first actuator of a locking device, so as to vary the pair of engaged gears.

4. An automatic manual transmission according to claim 3, wherein, in order to shift from a first gear having the shortest total transmission ratio to a second gear immediately following the first gear, the control unit exclusively activates the second actuator to vary the transmission ratio of the transmission device from the first unitary direct drive transmission ratio to the second multiplying transmission ratio.

5. An automatic manual transmission according to claim 4, wherein, in order to shift from the second gear to a third gear immediately following the second gear, the control unit simultaneously activates at least one first actuator of a locking device to vary the pair of engaged gears of the gearbox, and the second actuator to vary the transmission ratio of the transmission device from the second multiplying transmission ratio to the first unitary direct drive transmission ratio.

6. An automatic manual transmission according to claim 1, wherein, in order to shift in sequence up from the shortest gear to the longest gear, the control unit activates, at each gear shift, at least one first actuator of a locking device to vary the pair of engaged gears, and activate in an alternate manner, for one gear shift but not the next, the second actuator to vary the transmission ratio of the transmission device.

7. An automatic manual transmission according to claim 6, wherein, in order to shift from a first gear having the shortest total transmission ratio to a second gear immediately following the first gear, the control unit exclusively activates at least one first actuator of a locking device to vary the pair of engaged gears of the gearbox.

8. An automatic manual transmission according to claim 7, wherein, in order to shift from the second gear to a third gear immediately following the second gear, the control unit simultaneously activates at least one first actuator of a locking device to vary the pair of engaged gears of the gearbox, and the second actuator to vary the transmission ratio of the transmission device from the first unitary direct drive transmission ratio to the second multiplying transmission ratio.

9. An automatic manual transmission according to claim 1, wherein:

all the gears are divided into a lower group and an upper group, so that the longest gear of the lower group has a shorter transmission ratio than the shortest gear of the upper group;

in order to shift gear within a same group, the control unit exclusively activates at least one first actuator of a locking device to vary the pair of engaged gears of the gearbox; and in order to shift from a gear of the lower group to a gear of the upper group, the control unit simultaneously activates at least one first actuator of a locking device to vary the pair of engaged gears of the gearbox, and the second actuator to vary the transmission ratio of the transmission device.

10. An automatic manual transmission according to claim 1, wherein the clutch is interposed between the secondary shaft of the gearbox and a differential gear.

11. An automatic manual transmission according to claim 1, wherein the secondary shaft of the gearbox is tubular and hollow inside, so as to house therein an auxiliary shaft, which is connected to the secondary shaft by the clutch.

12. An automatic manual transmission according to claim 11, wherein a first end of the auxiliary shaft is connected to the clutch and a second end of the auxiliary shaft opposite to the first end is connected to a differential gear.

* * * * *